(12) United States Patent
Yamamoto

(10) Patent No.: US 12,482,214 B2
(45) Date of Patent: Nov. 25, 2025

(54) IMAGING APPARATUS AND INFORMATION PROCESSING APPARATUS

(71) Applicant: FUJIFILM Corporation, Tokyo (JP)

(72) Inventor: Hiroaki Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 71 days.

(21) Appl. No.: 18/631,566

(22) Filed: Apr. 10, 2024

(65) Prior Publication Data

US 2024/0257488 A1 Aug. 1, 2024

Related U.S. Application Data

(63) Continuation of application No. PCT/JP2022/035037, filed on Sep. 20, 2022.

(30) Foreign Application Priority Data

Oct. 20, 2021 (JP) .................................. 2021-171938

(51) Int. Cl.
*G06V 10/141* (2022.01)
(52) U.S. Cl.
CPC .................................. *G06V 10/141* (2022.01)
(58) Field of Classification Search
None
See application file for complete search history.

(56) References Cited

U.S. PATENT DOCUMENTS

| 9,605,941 | B2 * | 3/2017 | Ozcan | G01B 9/02041 |
| 12,243,128 | B2 * | 3/2025 | Yamamoto | G01N 15/0227 |
| 2011/0075928 | A1 | 3/2011 | Jeong et al. | |
| 2012/0196316 | A1 | 8/2012 | Sebesta et al. | |
| 2013/0280752 | A1 | 10/2013 | Ozcan et al. | |
| 2017/0153106 | A1 * | 6/2017 | Ozcan | G03H 1/02 |
| 2017/0168285 | A1 * | 6/2017 | Ozcan | G02B 21/0056 |
| 2020/0337189 | A1 * | 10/2020 | Huang | H04N 23/80 |

(Continued)

FOREIGN PATENT DOCUMENTS

| JP | 2011-242357 A | 12/2011 |
| JP | 2012-531584 A | 12/2012 |

(Continued)

OTHER PUBLICATIONS

International Search Report issued Nov. 29, 2022 in International Application No. PCT/JP2022/035037.

(Continued)

*Primary Examiner* — Cynthia Segura
(74) *Attorney, Agent, or Firm* — Sughrue Mion, PLLC

(57) ABSTRACT

An imaging apparatus includes: an illumination device that has a plurality of light sources which irradiate an observation target with illumination light beams at different irradiation angles; an imaging sensor that captures an interference fringe image generated by the observation target irradiated with the illumination light beams to generate image data; a height adjustment mechanism that enables a height of the illumination device with respect to the imaging sensor to be adjusted; and an angle change mechanism that changes the irradiation angle of the illumination light beam in accordance with the height such that an intersection of central axes of the illumination light beams emitted from the plurality of light sources is located on the observation target.

10 Claims, 16 Drawing Sheets

(56) References Cited

U.S. PATENT DOCUMENTS

2022/0292740 A1\* 9/2022 Yamamoto ......... G01N 15/1429
2023/0122800 A1\* 4/2023 Yamamoto ............ G06T 11/005
                                                        382/131

FOREIGN PATENT DOCUMENTS

| JP | 2014-507645 | A  | 3/2014 |
| JP | 2018-093795 | A  | 6/2018 |
| WO | 2021/117328 | A1 | 6/2021 |
| WO | 2022/181023 | A1 | 9/2022 |

OTHER PUBLICATIONS

Written Opinion issued Nov. 29, 2022 in International Application No. PCT/JP2022/035037.
International Preliminary Report on Patentability issued Apr. 23, 2024 with a Translation of the Written Opinion of the International Searching Authority in Application No. PCT/JP2022/035037.

\* cited by examiner

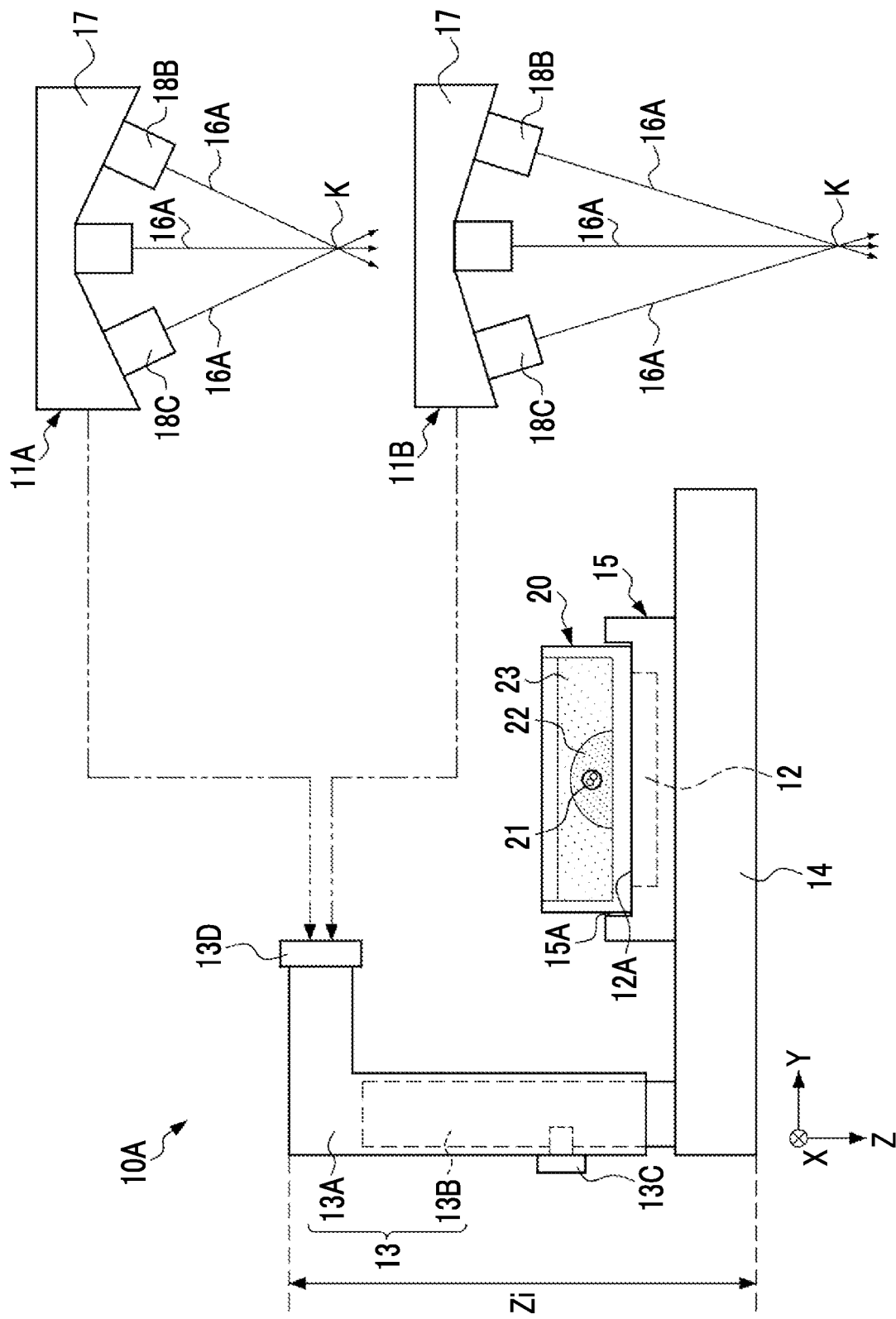

IMAGING APPARATUS AND INFORMATION PROCESSING APPARATUS

CROSS-REFERENCE TO RELATED APPLICATION

This application is a continuation application of International Application No. PCT/JP2022/035037, filed Sep. 20, 2022, the disclosure of which is incorporated herein by reference in its entirety. Further, this application claims priority from Japanese Patent Application No. 2021-171938 filed on Oct. 20, 2021, the disclosure of which is incorporated herein by reference in its entirety.

BACKGROUND

1. Technical Field

The technology of the present disclosure relates to an imaging apparatus and an information processing apparatus.

2. Description of the Related Art

In recent years, a demand for infertility treatment has increased. An incubator for fertilized eggs is used for culturing fertilized eggs that have been subjected to in-vitro fertilization. The fertilized eggs (embryos) cultured in the incubator are transferred or frozen. The embryo refers to a fertilized egg in a dividing state.

In the related art, in order to observe fertilized eggs during culture, it has been necessary to take out a culture dish (also referred to as a tray) containing the fertilized eggs from an incubator and then observe it with a microscope. In a case where the culture dish is taken out from the incubator, a problem in that stress is applied to the fertilized eggs because of a temperature change or the like arises.

Therefore, JP2018-093795A proposes an incubator that enables observation of fertilized eggs during culture without taking out a culture dish. The incubator disclosed in JP2018-093795A includes a culture portion that holds a plurality of culture dishes in a culture environment, and an imaging unit provided corresponding to the culture dishes held in the culture portion. As disclosed in JP2018-093795A, an incubator that enables observation of the fertilized eggs without removing the culture dish from the culture portion while culturing the fertilized eggs in the culture dish is called a time-lapse incubator.

Since the imaging unit disclosed in JP2018-093795A is an optical camera having a lens, a focus is adjusted by moving the lens along an optical axis. Human eggs are substantially spherical and have a diameter of about 100 to 150 μm. It is unknown at which position of the eggs the presence of the pronucleus or the like, which is a clue for determining fertilization of the eggs, exists. Therefore, the imaging unit disclosed in JP2018-093795A captures a plurality of images having different focal positions.

Although, in the related art, a microscope such as a phase contrast microscope has been used for observing cells or the like as in the apparatus disclosed in JP2018-093795A, it is necessary to perform focusing in imaging an observation object. Therefore, in recent years, lens-free digital holography, which does not require focusing in imaging an observation object, has been used (see, for example, JP2012-531584A).

In digital holography, an interference fringe image generated by irradiating an observation object with coherent light such as a laser beam is captured, and the interference fringe image obtained by the imaging is reconstructed, whereby a reconstructed image (so-called tomographic image) at an optional focal position can be generated.

SUMMARY

Since the incubator for fertilized eggs is small, it is necessary to reduce an apparatus size in order to accommodate the imaging apparatus in a culture room of the incubator. Therefore, the present applicant has proposed, in JP2021-031210A, an imaging apparatus that comprises a light source and an imaging sensor, and generates image data including an interference fringe image by imaging fertilized eggs seeded in a culture container, the imaging apparatus being capable of being taken in and out of a culture room provided in an incubator. In addition, the present applicant has proposed to provide a height adjustment mechanism that enables a height of the imaging apparatus to be adjusted.

In addition, it is considered to provide the imaging apparatus with a plurality of light sources that irradiate an observation target such as a fertilized egg with illumination light beams at different irradiation angles in order to acquire three-dimensional information of the observation target. However, in a case where the height of the imaging apparatus comprising the plurality of light sources that irradiate the observation target with the illumination light beams at the different irradiation angles can be changed, a distance from the plurality of light sources to the observation target may change, and thus the three-dimensional information may not be accurately acquired.

An object of the technology of the present disclosure is to provide an imaging apparatus and an information processing apparatus capable of acquiring three-dimensional information of an observation target with high accuracy even in a case where a height is changed.

In order to achieve the above object, an imaging apparatus of the present disclosure comprises: an illumination device that has a plurality of light sources which irradiate an observation target with illumination light beams at different irradiation angles; an imaging sensor that captures an interference fringe image generated by the observation target irradiated with the illumination light beams to generate image data; a height adjustment mechanism that enables a height of the illumination device with respect to the imaging sensor to be adjusted; and an angle change mechanism that changes the irradiation angle of the illumination light beam in accordance with the height such that an intersection of central axes of the illumination light beams emitted from the plurality of light sources is located on the observation target.

It is preferable that the angle change mechanism changes the irradiation angle of the illumination light beam by rotating at least one of the plurality of light sources.

It is preferable that the angle change mechanism changes the irradiation angle of the illumination light beam in conjunction with the change of the height by the height adjustment mechanism.

It is preferable that the imaging apparatus further comprises: a first processor that controls the angle change mechanism to change the irradiation angle, and that the first processor adjusts the irradiation angle by controlling the angle change mechanism based on a positional relationship between an estimated region where the observation target is estimated to be present and the interference fringe image in the image data.

It is preferable that the imaging apparatus further comprises: a support column that supports the illumination device, and that the height adjustment mechanism enables a length of the support column to be changed.

It is preferable that the angle change mechanism is configured of a plurality of the illumination devices having different irradiation angles of the illumination light beams and an attachment portion to which the plurality of illumination devices are selectively attached.

It is preferable that the imaging apparatus further comprises: a support column that supports the illumination device, and that the height adjustment mechanism enables a length of the support column to be changed, and the attachment portion is provided on the support column.

It is preferable that the imaging apparatus further comprises: a communication unit that wirelessly transmits the image data.

An information processing apparatus of the present disclosure comprises: a second processor that generates a reconstructed image by receiving the image data transmitted from the imaging apparatus and performing a reconstruction process based on the received image data.

It is preferable that the second processor generates a synthetic image by performing a synthetic aperture process on a plurality of the reconstructed images corresponding to the plurality of light sources.

According to the technology of the present disclosure, it is possible to provide an imaging apparatus and an information processing apparatus capable of acquiring three-dimensional information of an observation target with high accuracy even in a case where a height is changed.

BRIEF DESCRIPTION OF THE DRAWINGS

Exemplary embodiments according to the technique of the present disclosure will be described in detail based on the following figures, wherein:

FIG. 17 is a side view showing a configuration of an imaging apparatus according to a second embodiment.

DETAILED DESCRIPTION

An example of an embodiment relating to the technique of the present disclosure will be described with reference to the accompanying drawings.

First Embodiment

Figure 1:
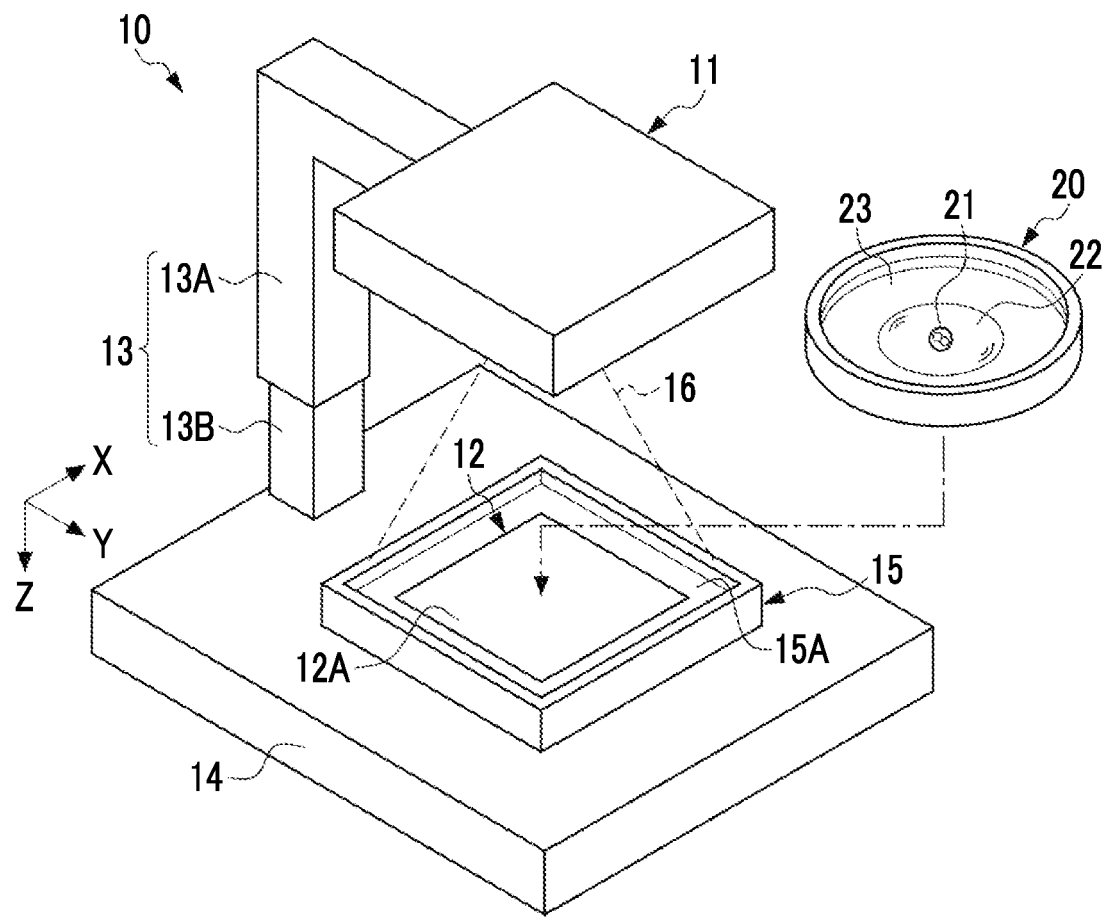
FIG. 1 is a perspective view showing an example of an imaging apparatus.

FIG. 1 shows an imaging apparatus 10 according to a first embodiment. The imaging apparatus 10 includes an illumination device 11, an imaging sensor 12, a support column 13, a base 14, and a stage 15. The imaging apparatus 10 performs so-called lens-free imaging in which an observation object is imaged without using an optical lens.

The illumination device 11 is connected to one end of a substantially L-shaped support column 13. The other end of the support column 13 is connected to the base 14. The base 14 has a flat plate shape, and the stage 15 is provided substantially in the center. The stage 15 is provided with a recessed placing part 15A on which a culture container 20 for culturing fertilized eggs is placed. The support column 13 supports the illumination device 11 such that the illumination device 11 faces an imaging surface 12A of the imaging sensor 12. The fertilized egg is an example of an "observation object" according to the technology of the present disclosure.

Hereinafter, a direction in which the illumination device 11 and the imaging surface 12A face each other is referred to as a Z direction. One direction orthogonal to the Z direction is referred to as an X direction. A direction orthogonal to the Z direction and the X direction is called a Y direction. The imaging surface 12A is orthogonal to the Z direction and is parallel to the X direction and the Y direction.

The imaging sensor 12 is composed of, for example, a monochrome complementary metal oxide semiconductor (CMOS) imaging sensor. The culture container 20 is placed on the imaging surface 12A of the imaging sensor 12. The culture container 20 is a shallow cylindrical container, and is also called a culture dish. The culture container 20 is transparent and transmits an illumination light beam 16 emitted from the illumination device 11. A diameter of the culture container 20 is about 30 to 60 mm. A thickness of the culture container 20 is about 10 to 20 mm.

A fertilized egg 21 that has been subjected to in-vitro fertilization is seeded in the culture container 20. Examples of the in-vitro fertilization include microinsemination performed under a microscope and normal in-vitro fertilization in which an egg and a sperm are treated together in a predetermined container. A method of fertilizing the fertilized eggs 21 to be cultured does not matter. The fertilized egg 21 is, for example, a human fertilized egg. The fertilized egg 21 is substantially spherical and has a diameter of about 100 to 200 μm.

Each of the fertilized eggs 21 floats in a culture solution 22 added dropwise into the culture container 20. The culture solution 22 is covered with oil 23 filling the culture container 20. The oil 23 suppresses evaporation of the culture solution 22 and a change in pH. The fertilized egg 21 in a dividing state is also called an embryo. The fertilized egg 21 in the present disclosure includes an embryo.

In the culture container 20, the fertilized egg 21 is imaged by the imaging apparatus 10 in a state where the culture container 20 is covered with a translucent lid (not shown).

Figure 2:
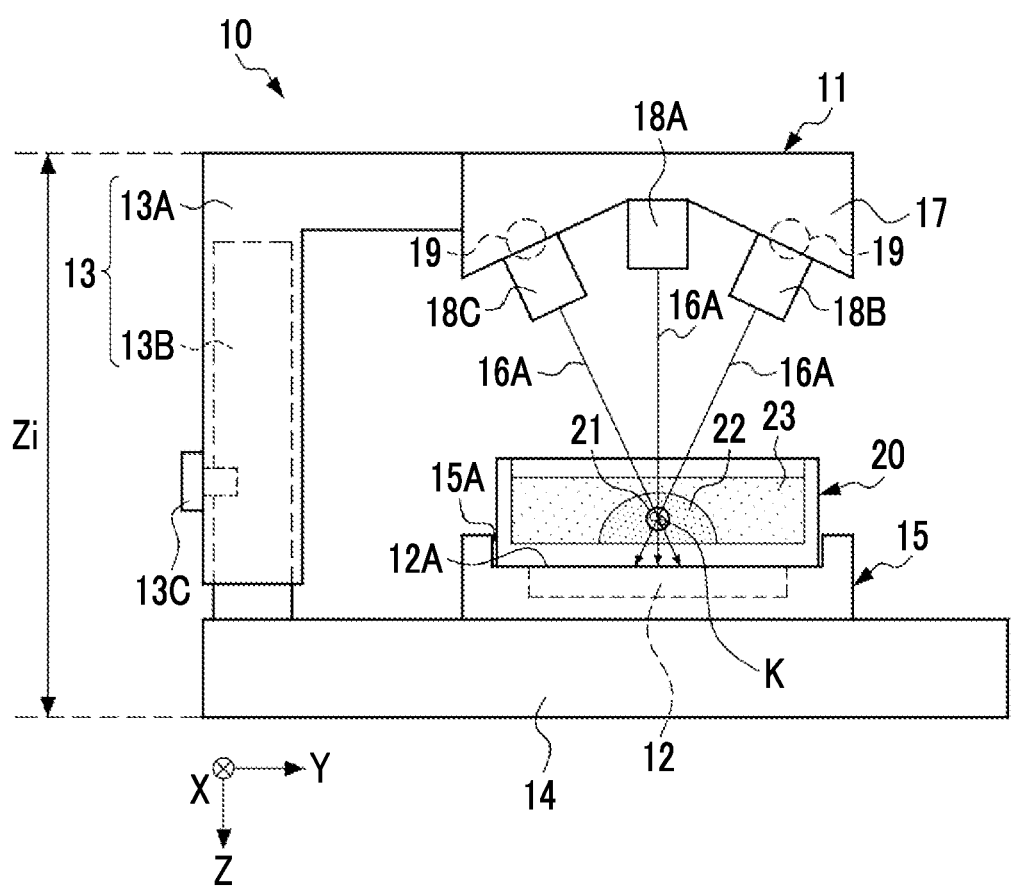
FIG. 2 is a side view of an imaging apparatus on which a culture container is placed.
Figure 3:
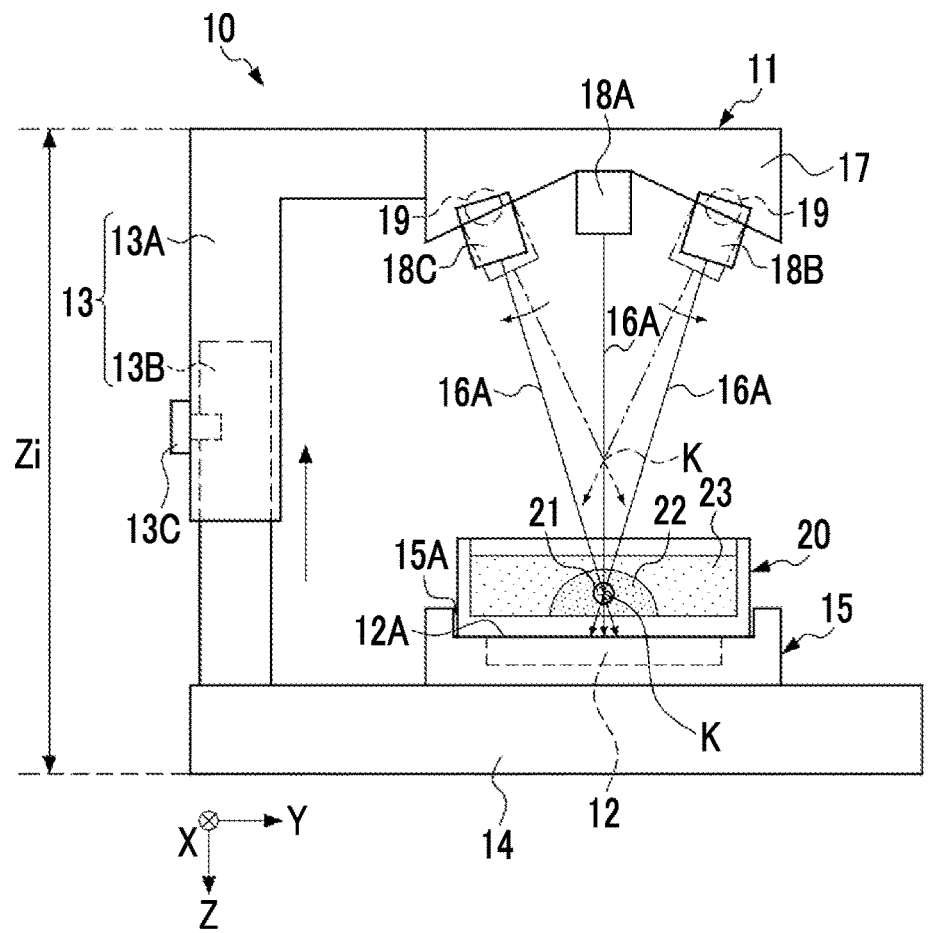
FIG. 3 is a side view of the imaging apparatus on which the culture container is placed.

In addition, as shown in FIGS. 2 and 3, the imaging apparatus 10 is configured such that a height Zi (that is, a length in the Z direction) can be changed. The height Zi of the imaging apparatus 10 can be changed by changing a length of the support column 13. Specifically, the support column 13 is separated into an upper part 13A and a lower part 13B. The illumination device 11 is connected to the upper part 13A. The lower part 13B is connected to the base 14. The upper part 13A and the lower part 13B are slidably fitted to each other. The upper part 13A and the lower part 13B are an example of a "height adjustment mechanism" according to the technology of the present disclosure.

The height Zi of the imaging apparatus 10 can be changed by sliding the upper part 13A with respect to the lower part 13B. The support column 13 is provided with a fixing screw 13C for fixing the upper part 13A and the lower part 13B. A user adjusts a position of the upper part 13A with respect to the lower part 13B and operates the fixing screw 13C in a state where the height Zi of the imaging apparatus 10 is set to a desired value, thereby fixing the upper part 13A to the lower part 13B.

The upper part 13A may be configured to slide with respect to the lower part 13B by a drive mechanism (not shown). In this case, it is preferable that the upper part 13A is configured to move in response to an operation of a switch (not shown).

In addition, adjusting the height Zi of the imaging apparatus 10 corresponds to adjusting a height of the illumination device 11 with respect to the imaging sensor 12. Therefore, the upper part 13A and the lower part 13B are an example of a "height adjustment mechanism that enables a height of the illumination device with respect to the imaging sensor to be adjusted" according to the technology of the present disclosure. The height adjustment mechanism is not limited to the above-mentioned configuration and can be changed as appropriate.

FIGS. 2 and 3 are side views of the imaging apparatus 10 on which the culture container 20 is placed. As shown in FIG. 2, the illumination device 11 includes a base 17 and three light sources 18A, 18B, and 18C. The base 17 is connected to the support column 13. The light sources 18A, 18B, and 18C are provided on a surface of the base 17 facing the stage 15.

The light sources 18A, 18B, and 18C are each composed of, for example, a laser diode, and emit the illumination light beam 16 (see FIG. 1) toward the stage 15. The light sources 18A, 18B, and 18C may be configured by combining a light emitting diode and a pinhole, respectively. The illumination light beam 16 is coherent light. A wavelength of the illumination light beam 16 is 640 nm, 780 nm, or the like. The illumination light beam 16 is radiation light. In addition, FIGS. 2 and 3 show a central axis 16A of the illumination light beam 16.

The light sources 18A, 18B, and 18C have different irradiation angles of the illumination light beams 16 with respect to the imaging surface 12A of the imaging sensor 12. The light source 18A is mounted at a position facing the center of the imaging surface 12A of the base 17, and emits the illumination light beam 16 from a direction substantially orthogonal to the imaging surface 12A.

The light source 18B is mounted at a position deviated from the mounting position of the light source 18A of the base 17 in the +Y direction, and emits the illumination light beam 16 from an oblique direction with respect to the imaging surface 12A. The light source 18C is mounted at a position deviated from the mounting position of the light source 18A of the base 17 in the −Y direction, and emits the illumination light beam 16 from an oblique direction with respect to the imaging surface 12A. The light source 18B and the light source 18C are disposed at positions symmetrical with respect to the light source 18A in the Y direction. In addition, the light source 18B and the light source 18C are disposed on an inclined surface formed on the base 17.

An angle change mechanism 19 that enables the irradiation angle of the illumination light beam 16 with respect to the imaging surface 12A of the imaging sensor 12 to be changed is provided in the light source 18B and the light source 18C. The angle change mechanism 19 rotates each of the light source 18B and the light source 18C with respect to the base 17 about a rotation axis parallel to the X direction. That is, the angle change mechanism 19 rotates the central axis 16A of the illumination light beam 16 about the rotation axis parallel to the X direction.

In addition, the angle change mechanism 19 is configured to rotate each of the light source 18B and the light source 18C in conjunction with the change in the height Zi of the imaging apparatus 10. In the present embodiment, the angle change mechanism 19 is a mechanical rotation mechanism, and is rotated in conjunction with the sliding of the upper part 13A with respect to the lower part 13B.

In FIGS. 2 and 3, reference numeral K indicates an intersection at which the central axes 16A of a plurality of the illumination light beams 16 emitted from the light sources 18A, 18B, and 18C intersect with each other. In order to accurately acquire three-dimensional information of the fertilized egg 21, which is the observation target, the fertilized egg 21 is preferably disposed at the intersection K.

The imaging sensor 12 detects the illumination light beam 16 emitted from each of the light sources 18A, 18B, and 18C and transmitted through the culture container 20. Specifically, the illumination light beam 16 is incident into the culture container 20, and the illumination light beam 16 is diffracted by the fertilized egg 21, so that an interference fringe image reflecting a shape and an internal structure of the fertilized egg 21 is generated. The interference fringe image is also called a hologram image. The imaging sensor 12 captures the interference fringe image generated by the fertilized egg 21.

FIG. 2 shows a state in which the height Zi of the imaging apparatus 10 is minimized. In FIG. 2, the fertilized egg 21, which is the observation target, is located at the intersection K of the central axes 16A.

FIG. 3 shows a state in which the height Zi of the imaging apparatus 10 is changed and the height Zi is made higher than that in the case shown in FIG. 2. As shown in FIG. 3, in a case where the height Zi of the imaging apparatus 10 is changed, the light source 18B and the light source 18C are rotated by the angle change mechanism 19, and the orientation of the central axis 16A of the illumination light beam 16 is changed. The angle change mechanism 19 is configured such that the position of the intersection K is not changed even in a case where the height Zi is changed.

In FIG. 3, the light sources 18B and 18C and the central axis 16A before rotation are indicated by two-dot chain lines. In this way, in a case where the light source 18B and the light source 18C are not rotated in accordance with the height Zi, a shift occurs between the positions of the intersection K and the fertilized egg 21, which is the observation target, but by rotating the light source 18B and the light source 18C according to the change in the height Zi, the position of the intersection K is maintained at the position of the fertilized egg 21.

Figure 4:
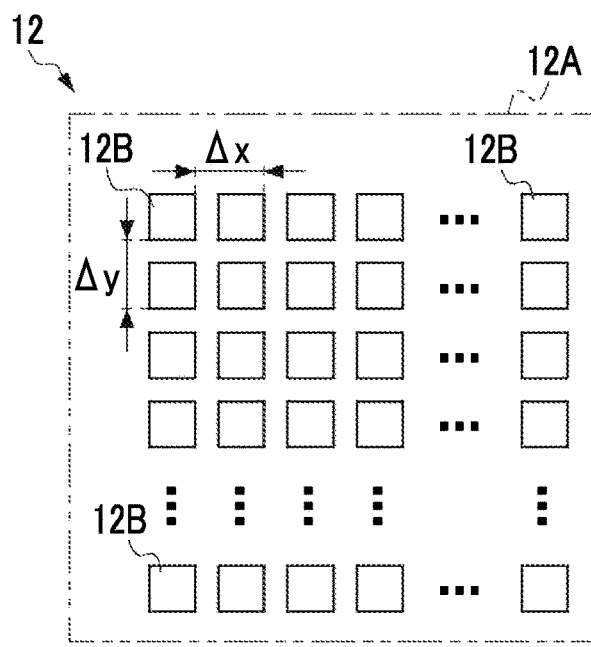
FIG. 4 is a diagram showing an example of a configuration of an imaging sensor.

FIG. 4 shows an example of a configuration of the imaging sensor 12. The imaging sensor 12 has a plurality of pixels 12B disposed on the imaging surface 12A. The pixel 12B is a photoelectric conversion element that outputs a pixel signal according to the amount of incidence light by photoelectrically converting the incidence light.

The pixels 12B are arranged at equal pitches along the X direction and the Y direction. The array of the pixels 12B is a so-called square array. The X direction is a direction orthogonal to the Z direction. The Y direction is a direction orthogonal to the X direction and the Z direction. The pixels 12B are arranged at a first arrangement pitch $\Delta x$ in the X direction and are arranged at a second arrangement pitch $\Delta y$ in the Y direction.

The imaging sensor 12 images the light incident on the imaging surface 12A, and outputs image data DT composed of the pixel signal output from each of the pixels 12B.

Figure 5:
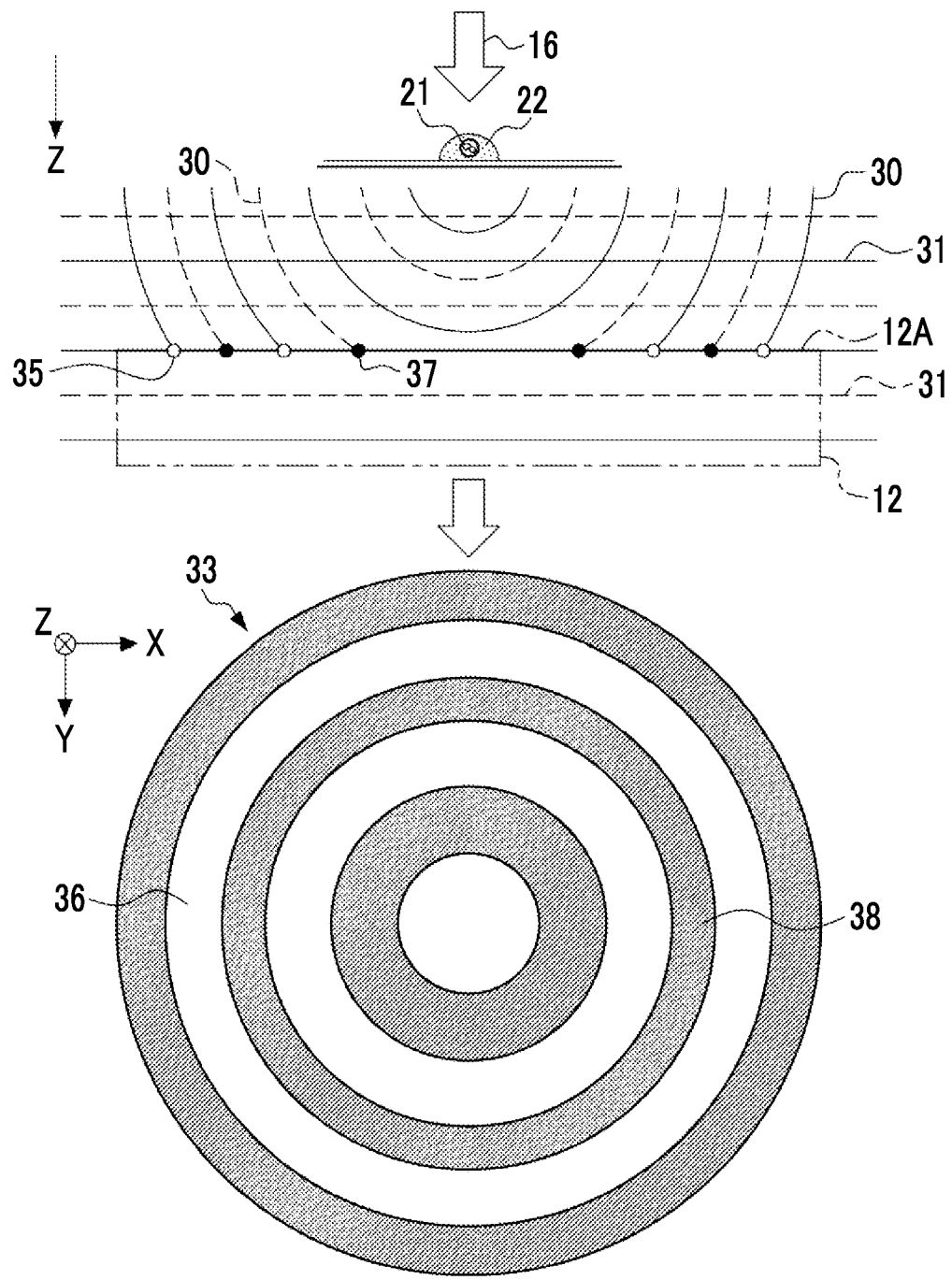
FIG. 5 is a diagram showing a state in which an interference fringe image is generated by irradiating a fertilized egg with an illumination light beam.

FIG. 5 shows a state in which an interference fringe image is generated by irradiating the fertilized egg 21 with the illumination light beam 16. A part of the illumination light beam 16 incident into the culture container 20 is diffracted by the fertilized egg 21. That is, the illumination light beam 16 is divided into diffracted light 30 diffracted by the fertilized egg 21 and transmitted light 31 that is not diffracted by the fertilized egg 21 and is transmitted through the culture container 20. The transmitted light 31 is a spherical wave or a plane wave. The diffracted light 30 and the transmitted light 31 are transmitted through the bottom surface of the culture container 20 and are incident on the imaging surface 12A of the imaging sensor 12.

The diffracted light 30 and the transmitted light 31 interfere with each other to generate an interference fringe image 33. The interference fringe image 33 is composed of a bright portion 36 and a dark portion 38. In FIG. 5, although the interference fringe image 33 shows the bright portion 36 and the dark portion 38 as circles, a shape of the interference fringe image 33 changes according to the shape and the internal structure of the fertilized egg 21. The imaging sensor 12 captures an optical image including the interference fringe image 33 formed on the imaging surface 12A, and outputs image data DT including the interference fringe image 33.

The imaging sensor 12 outputs the image data DT by capturing the optical image including the interference fringe image 33 each time the illumination light beam 16 is applied to the fertilized egg 21 from each of the light sources 18A, 18B, and 18C.

Figure 6:
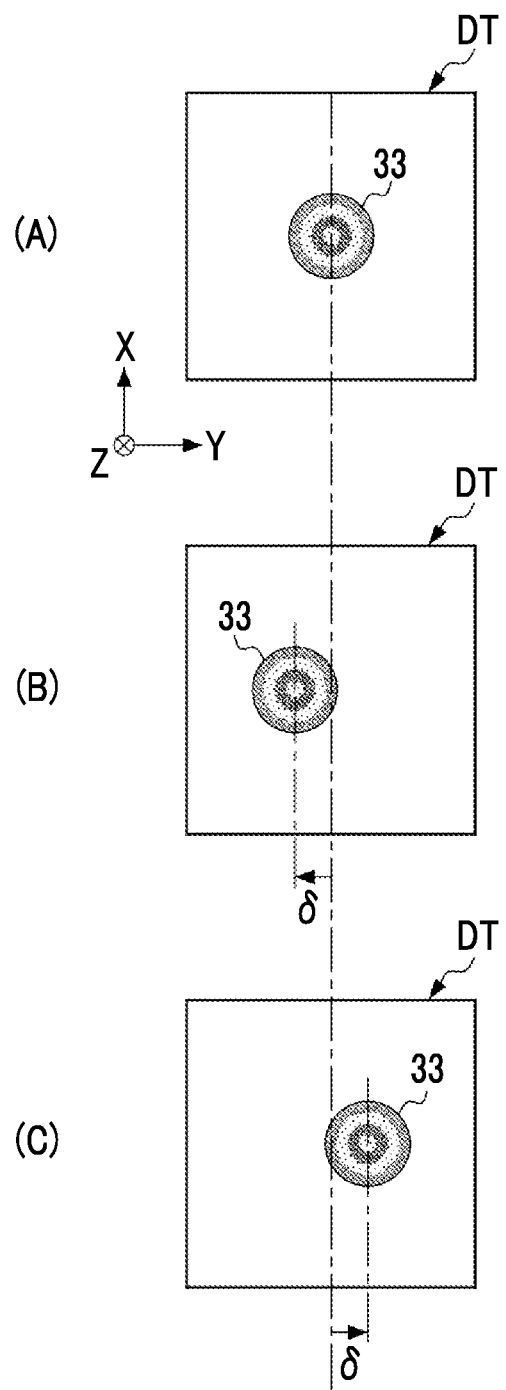
FIG. 6 is a diagram showing an example of image data generated by the imaging sensor.

FIG. 6 shows an example of the image data DT generated by the imaging sensor 12. (A) of FIG. 6 shows the image data DT generated by the imaging sensor 12 in a case where the illumination light beam 16 is emitted from the light source 18A. (B) of FIG. 6 shows the image data DT generated by the imaging sensor 12 in a case where the illumination light beam 16 is emitted from the light source 18B. (C) of FIG. 6 shows the image data DT generated by the imaging sensor 12 in a case where the illumination light beam 16 is emitted from the light source 18C.

A position of the interference fringe image 33 reflected in the image data DT varies depending on the irradiation angle of the illumination light beam 16. In a case where the illumination light beam 16 is emitted from the light source 18A, as shown in (A) of FIG. 6, the interference fringe image 33 is located at the center in the Y direction. In a case where the illumination light beam 16 is emitted from the light source 18B, the interference fringe image 33 is moved to a position shifted by $\delta$ in the $-Y$ direction from the center as shown in (B) of FIG. 6. In a case where the illumination light beam 16 is emitted from the light source 18C, the interference fringe image 33 is moved to a position shifted by $\delta$ in the $+Y$ direction from the center as shown in (C) of FIG. 6.

The shift amount $\delta$ depends on a height from the imaging surface 12A to the fertilized egg 21 and an incidence angle of the illumination light beam 16 from the light source 18B and the light source 18C to the fertilized egg 21.

Figure 7:
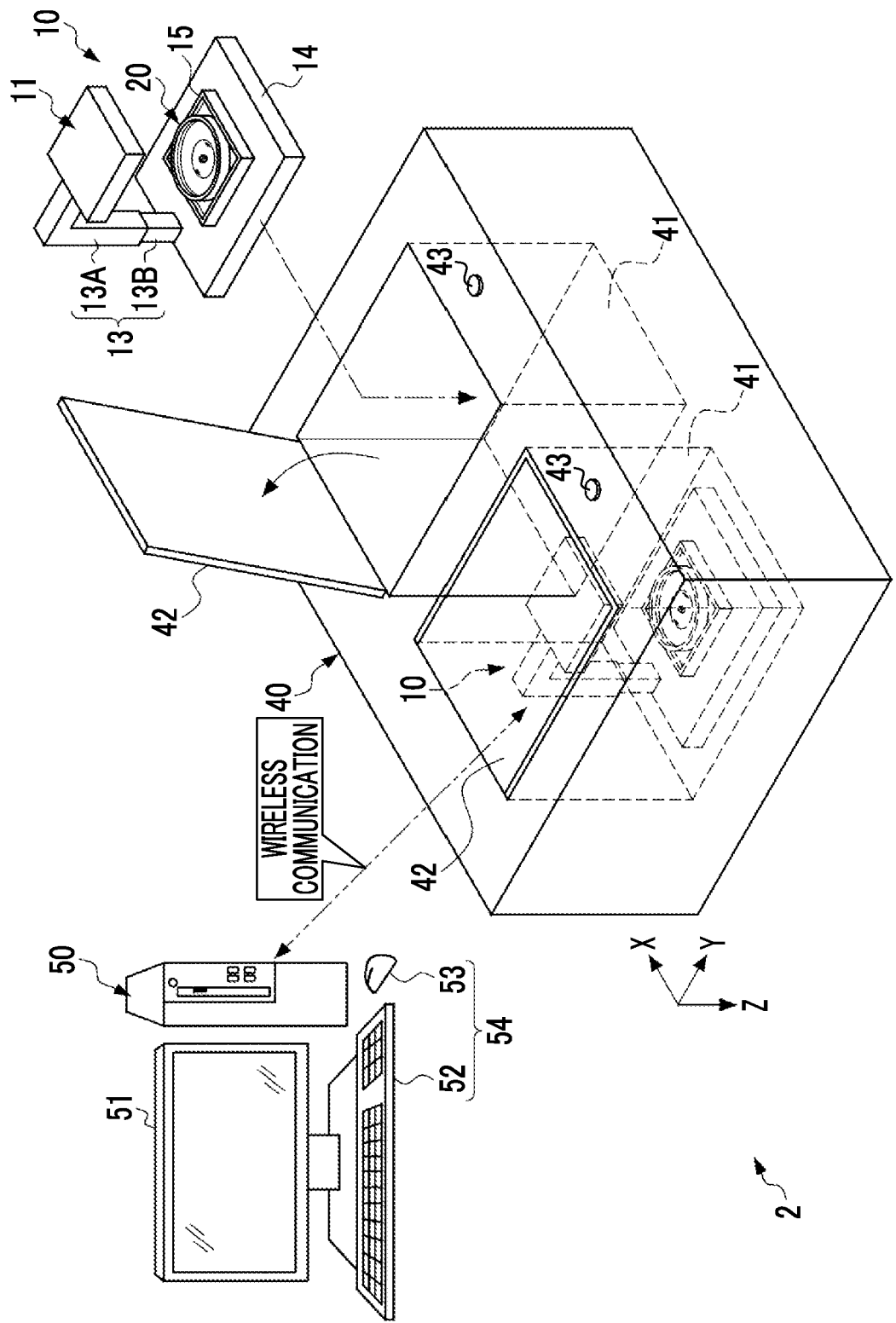
FIG. 7 is a schematic view showing an example of a configuration of a time-lapse imaging system.

FIG. 7 shows an example of a configuration of a time-lapse imaging system. As shown in FIG. 7, a time-lapse imaging system 2 includes an imaging apparatus 10, an incubator 40, and an information processing apparatus 50. The incubator 40 is a multi-room incubator for fertilized eggs and is also called an embryo culture device. The fertilized eggs 21 are cultured in the incubator 40 for a predetermined period (for example, 7 days).

The incubator 40 has a plurality of culture rooms 41 rather than one culture room like a general incubator for culturing cells other than fertilized eggs. This is because the imaging apparatus 10 is accommodated in each of the culture rooms 41, so that the fertilized eggs 21 are individually managed so as not to be confused with the fertilized eggs 21 of another person. The culture room 41 is also called a culture chamber. Although the incubator 40 shown in FIG. 7 is provided with two culture rooms 41, the number of the culture rooms 41 is not limited thereto and can be changed as appropriate.

Each of the culture rooms 41 is provided with an openable and closable lid 42. The incubator 40 is provided with a switch 43 for opening and closing the lid 42 for each culture room 41. In a case where the user operates the switch 43, the lid 42 is opened and closed by a drive mechanism (not shown). The lid 42 may be manually opened and closed. The culture room 41 is kept airtight in a case where the lid 42 is closed.

A mixed gas obtained by mixing carbon dioxide ($CO_2$) gas and nitrogen ($N_2$) gas with outside air is supplied to the culture room 41 from an external gas cylinder (not shown) via a high efficiency particulate air (HEPA) filter. A heater (not shown) is provided on side surfaces and a bottom surface of the culture room 41. A culture environment of the culture room 41 is kept constant by controlling the concentration, temperature, and humidity of the mixed gas to be constant.

The imaging apparatus 10 has a size enough to be taken in and out of the culture room 41. As shown in FIG. 7, one imaging apparatus 10 is inserted into one culture room 41. That is, the lid 42 can be closed in a state where the imaging apparatus 10 on which the culture container 20 is placed is inserted into the culture room 41. Thus, while the fertilized egg 21 is cultured in the culture room 41, the fertilized egg 21 can be imaged by the imaging apparatus 10 without taking out the culture container 20 from the culture room 41.

For example, the culture room 41 is a space having a substantially rectangular parallelepiped shape. A length of the culture room 41 in the X direction is denoted by Xc, a length of the culture room 41 in the Y direction is denoted by Yc, and a length of the culture room 41 in the Z direction is denoted by Zc. Hereinafter, the length Zc is also referred to as the height of the culture room 41. Since a height of the culture container 20 used for culturing the fertilized egg 21 is usually about 10 to 20 mm, the height Zc of the culture room 41 is lower than a height of a culture room of a general incubator for culturing cells other than the fertilized egg, and is, for example, less than 10 cm.

The imaging apparatus 10 is inserted into the culture room 41 after being adjusted such that the height Zi satisfies a relationship of Zi<Zc.

The information processing apparatus 50 is, for example, a desktop personal computer. A display 51, a keyboard 52, and a mouse 53 are connected to the information processing apparatus 50. The keyboard 52 and the mouse 53 constitute an input device 54 for the user to input information. The input device 54 also includes a touch panel and the like.

The information processing apparatus 50 exchanges data with the imaging apparatus 10 accommodated in each of the culture rooms 41 by wireless communication. The imaging apparatus 10 performs imaging periodically (for example, every 5 to 15 minutes). The information processing apparatus 50 periodically receives image data including the interference fringe image 33 (see FIG. 5) from the imaging apparatus 10, performs a reconstruction process based on the received image data, and displays a reconstructed image generated by the reconstruction process. The reconstructed image is also called a tomographic image.

Figure 8:
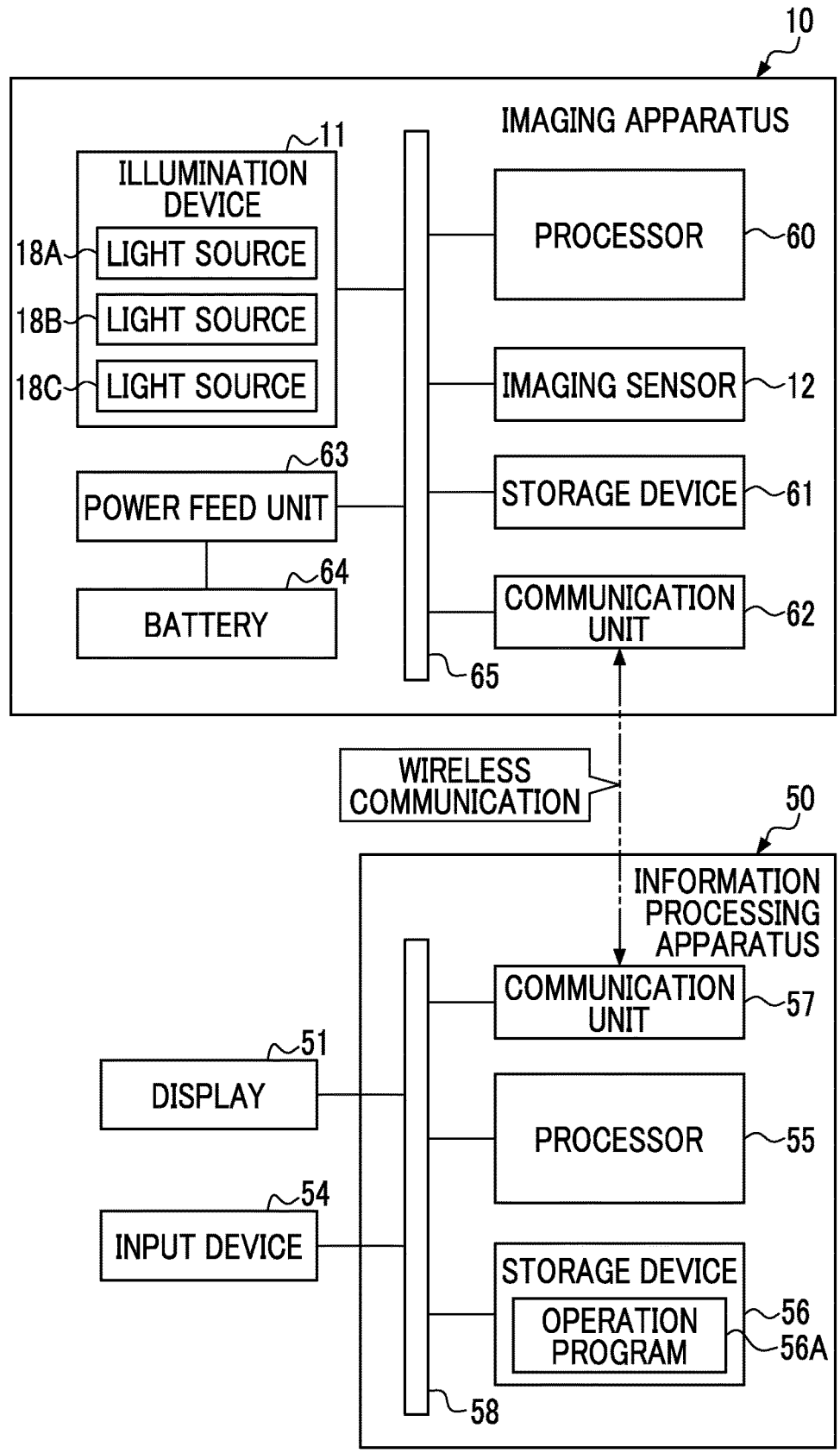
FIG. 8 is a block diagram showing an example of an internal configuration of the imaging apparatus and an information processing apparatus.

FIG. 8 shows an example of an internal configuration of the imaging apparatus 10 and the information processing apparatus 50. As shown in FIG. 8, in addition to the illumination device 11 and the imaging sensor 12, the imaging apparatus 10 comprises a processor 60, a storage device 61, a communication unit 62, a power feed unit 63, and a battery 64, which are interconnected via a busline 65. The processor 60 is an example of a "first processor" according to the technology of the present disclosure. The communication unit 62 is an example of a communication device in this disclosure.

The processor 60 is, for example, a field programmable gate array (FPGA) and controls an operation of each part in the imaging apparatus 10. The storage device 61 is a random access memory (RAM), a flash memory, or the like. The storage device 61 stores the image data generated by the imaging apparatus 10 and various kinds of data.

The communication unit 62 performs wireless communication with the information processing apparatus 50. The processor 60 transmits the image data to the information processing apparatus 50 via the communication unit 62.

The battery 64 is a secondary battery such as a lithium polymer battery. The power feed unit 63 includes a power supply circuit and a charge control circuit. The power feed unit 63 supplies power supplied from the battery 64 to the processor 60. In addition, the power feed unit 63 controls charging of the battery 64 by power supplied from the outside. The power feed unit 63 may be configured to charge the battery 64 wirelessly.

The information processing apparatus 50 comprises a processor 55, a storage device 56, and a communication unit 57, which are interconnected via a busline 58. The display 51 and the input device 54 described above are connected to the busline 58.

The processor 55 is composed of, for example, a central processing unit (CPU), and realizes various functions by reading out an operation program 56A and various kinds of data stored in the storage device 56 and executing processing.

The storage device 56 includes, for example, a RAM, a read only memory (ROM), and a storage. The RAM is, for example, a volatile memory used as a work area or the like. The ROM is, for example, a non-volatile memory such as a flash memory that holds the operation program 56A and various kinds of data. The storage is, for example, a hard disk drive (HDD) or a solid state drive (SSD). The storage stores an operating system (OS), an application program, image data, various kinds of data, and the like.

The communication unit 57 performs wireless communication with the communication unit 62 of the imaging apparatus 10. The processor 55 receives the image data transmitted from the imaging apparatus 10 via the communication unit 57. In addition, the processor 55 transmits, to the imaging apparatus 10, a control signal for controlling imaging via the communication unit 57.

The display 51 displays various screens. The information processing apparatus 50 receives input of an operation instruction from the input device 54 through various screens.

Figure 9:
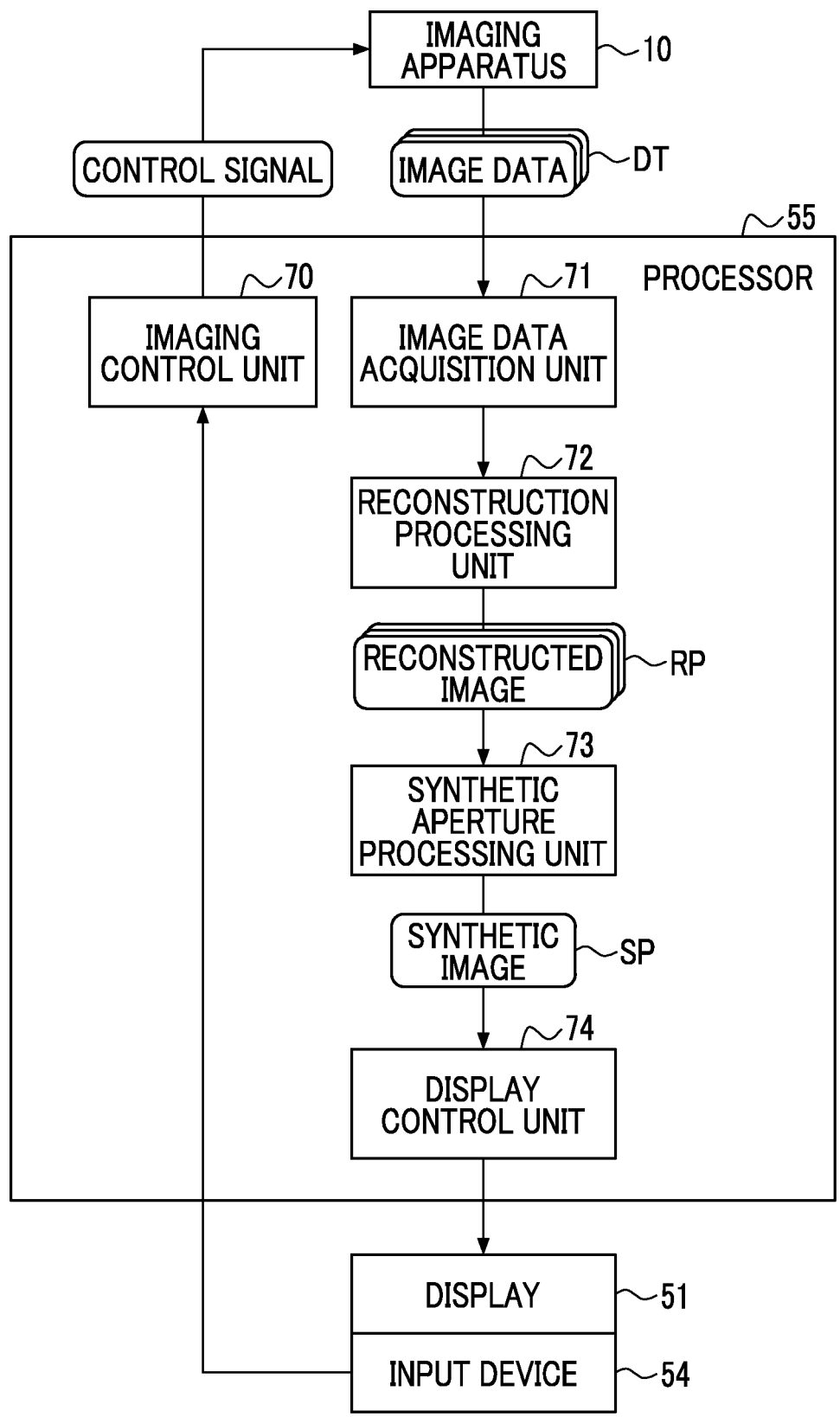
FIG. 9 is a block diagram showing an example of a functional configuration of the information processing apparatus.

FIG. 9 shows an example of a functional configuration of the information processing apparatus 50. The function of the information processing apparatus 50 is realized by the processor 55 executing processing based on the operation program 56A. As shown in FIG. 9, the processor 55 includes an imaging control unit 70, an image data acquisition unit 71, a reconstruction processing unit 72, a synthetic aperture processing unit 73, and a display control unit 74.

The imaging control unit 70 controls an operation of the imaging apparatus 10. Specifically, the imaging control unit 70 controls an operation of generating the illumination light beam 16 by the illumination device 11 and an imaging operation of the imaging sensor 12 by transmitting a control signal to the imaging apparatus 10. More specifically, the imaging control unit 70 sequentially emits the illumination light beam 16 from the light sources 18A, 18B, and 18C included in the illumination device 11, and causes the imaging sensor 12 to perform the imaging operation each time the illumination light beam 16 is emitted.

Hereinafter, the operation of generating the illumination light beam 16 by the illumination device 11 and the imaging operation of the imaging sensor 12 are collectively referred to as an imaging operation of the imaging apparatus 10. The imaging control unit 70 causes the imaging apparatus 10 to start the imaging operation based on an operation signal input from the input device 54.

The image data acquisition unit 71 acquires three pieces of generated image data DT transmitted from the imaging apparatus 10 after the imaging apparatus 10 images the fertilized egg 21 in the culture container 20. The three pieces of image data DT correspond to the light sources 18A, 18B, and 18C, and have different irradiation angles of the illumination light beam 16 with respect to the imaging surface 12A of the imaging sensor 12. The image data acquisition unit 71 supplies the three pieces of image data DT acquired from the imaging apparatus 10 to the reconstruction processing unit 72.

Figure 10:
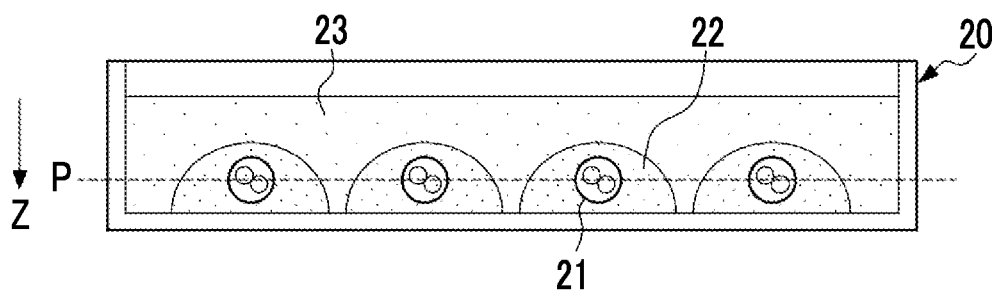
FIG. 10 is a diagram showing an example of a reconstruction position.

The reconstruction processing unit 72 generates three reconstructed images RP by performing an operation based on each of the three pieces of image data DT supplied from the image data acquisition unit 71. For example, as shown in FIG. 10, the reconstruction processing unit 72 generates the reconstructed image RP for a predetermined reconstruction position P which is a height at which the fertilized egg 21 is present. The reconstruction position P is a position (so-called depth position) represented by a distance d from the imaging surface 12A of the imaging sensor 12 in the direction of the illumination device 11. The reconstruction position P may be set or changed by the user operating the input device 54.

The reconstruction processing unit 72 performs a reconstruction process based on, for example, Fresnel transform equations represented by Equations (1) to (3).

$$\Gamma(m, n) = \frac{i}{\lambda d}\exp\left(-i\frac{2\pi}{\lambda}d\right)\exp\left[-i\pi\lambda d\left(\frac{m^2}{N_x^2\Delta x^2} + \frac{n^2}{N_y^2\Delta y^2}\right)\right] \times \quad (1)$$

$$\sum_{x=0}^{N_x-1}\sum_{y=0}^{N_y-1} I(x, y)\exp\left[-i\frac{\pi}{\lambda d}(x^2\Delta x^2 + y^2\Delta y^2)\right]\exp\left[i2\pi\left(\frac{xm}{N_x^2} + \frac{yn}{N_y^2}\right)\right]$$

$$A_0(m, n) = |\Gamma(m, n)|^2 \quad (2)$$

$$\varphi_0(m, n) = \arctan\frac{\mathrm{Im}[\Gamma(m, n)]}{\mathrm{Re}[\Gamma(m, n)]} \quad (3)$$

Here, I(x,y) represents image data. x represents coordinates of the pixel 12B (see FIG. 4) of the imaging sensor 12 in the X direction. y represents coordinates of the pixel 12B in the Y direction. Δx is the above-described first arrangement pitch, and Δy is the above-described second arrangement pitch (see FIG. 4). λ is a wavelength of the illumination light beam 16.

As shown in Equation (1), Γ(m,n) represents a complex amplitude image in which an interference fringe image included in the image data is Fresnel-transformed. Here, m=1, 2, 3, . . . Nx−1 and n=1, 2, 3, . . . Ny−1. Nx represents the number of pixels in the X direction of the image data. Ny represents the number of pixels in the Y direction of the image data.

As shown in Equation (2), $A_0(m, n)$ represents an intensity distribution image representing an intensity component of the complex amplitude image Γ(m,n). As shown in Equation (3), $\varphi_0(m,n)$ represents a phase distribution image representing a phase component of the complex amplitude image Γ(m,n).

The reconstruction processing unit 72 obtains the complex amplitude image Γ(m,n) based on Equation (1), and applies the obtained complex amplitude image Γ(m,n) to Equation (2) or Equation (3), whereby the intensity distribution image $A_0(m,n)$ or the phase distribution image $\varphi_0(m,n)$ is obtained. The reconstruction processing unit 72 obtains any one of the intensity distribution image $A_0(m,n)$ or the phase distribution image $\varphi_0(m,n)$ and outputs the obtained image as the reconstructed image RP.

In the present embodiment, the reconstruction processing unit 72 outputs the phase distribution image $\varphi_0(m,n)$ as the reconstructed image RP. The phase distribution image $\varphi_0(m,n)$ is an image showing a refractive index distribution of the observation object. Since the fertilized egg 21, which is the observation object in the present embodiment, is translucent, a major part of the illumination light beam 16 is transmitted or diffracted without being absorbed by the fertilized egg 21, so that almost no image appears in the intensity distribution. Therefore, in the present embodiment, it is preferable to use the phase distribution image $\varphi_0(m,n)$ as the reconstructed image RP.

The reconstruction processing unit 72 is not limited to the method using the Fresnel transform equation, and may perform the reconstruction process by a Fourier iterative phase retrieval method or the like.

The reconstruction processing unit 72 generates three reconstructed images RP by performing the reconstruction process on each of the three pieces of image data DT supplied from the image data acquisition unit 71. The reconstruction processing unit 72 supplies the generated three reconstructed images RP to the synthetic aperture processing unit 73. The three reconstructed images RP correspond to the light sources 18A, 18B, and 18C, and have different irradiation angles of the illumination light beam 16 with respect to the imaging surface 12A of the imaging sensor 12.

The synthetic aperture processing unit 73 generates a synthetic image SP by performing a synthetic aperture process on the three reconstructed images RP supplied from the reconstruction processing unit 72. Specifically, the synthetic aperture processing unit 73 performs a Fourier transform on each of the three reconstructed images RP to synthesize them in a frequency space, and performs an inverse Fourier transform on the synthesized frequency data to generate a synthetic image SP. The three reconstructed images RP are images in which the irradiation angles of the illumination light beams 16 with respect to the observation object are different. Therefore, by synthesizing the three reconstructed images in a frequency space, high-frequency components of the observation object are taken in, and a high-quality synthetic image SP with high spatial resolution is obtained. The synthetic image SP is an image including depth information (that is, three-dimensional information) of the fertilized egg 21.

In particular, in the synthetic aperture process, in a case where imaging is performed using a plurality of light beams passing through the same point or the same region of the fertilized egg 21, an acquisition accuracy of the three-dimensional information of the fertilized egg 21 is improved, and a high-quality synthetic image SP is obtained. That is, in a case where the above-described intersection K is located in the fertilized egg 21, the high-quality synthetic image SP is obtained.

The display control unit 74 causes the display 51 to display the synthetic image SP generated by the synthetic aperture processing unit 73. In the present embodiment, the display control unit 74 causes the display 51 to display the synthetic image SP corresponding to one reconstruction position P, and may cause the display 51 to display a plurality of synthetic images SPs corresponding to a plurality of reconstruction positions P.

Figure 11:
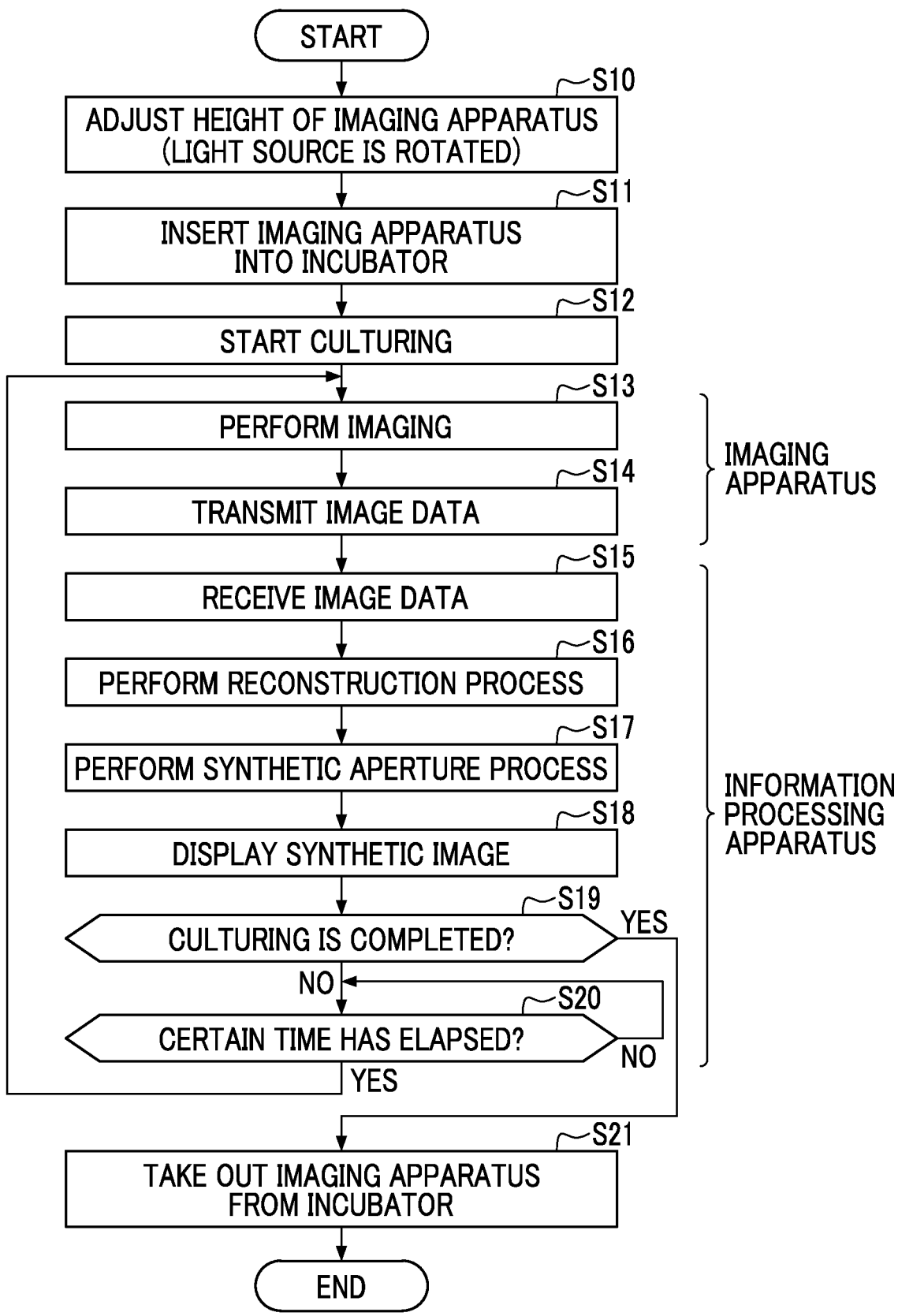
FIG. 11 is a flowchart showing an example of the overall operation of the time-lapse imaging system.

Next, an example of the overall operation of the time-lapse imaging system 2 will be described with reference to a flowchart shown in FIG. 11. First, the user adjusts the height Zi of the imaging apparatus 10 in accordance with the height Zc of the culture room 41 of the incubator 40 (Step S10). In Step S10, the light source 18B and the light source 18C are rotated in conjunction with the change of the height Zi of the imaging apparatus 10 by the user.

Next, the user places the culture container 20 on the stage 15 of the imaging apparatus 10, and inserts the imaging apparatus 10 into the culture room 41 of the incubator 40 (Step S11). The imaging apparatus 10 need only be inserted into at least one of the plurality of culture rooms 41.

Next, the user closes the lid 42 of the culture room 41 and causes the incubator 40 to start culturing (Step S12). In a case where the incubator 40 starts culturing, the imaging apparatus 10 images the fertilized egg 21 in the culture container 20 under the control from the information processing apparatus 50 (Step S13). The imaging apparatus 10 wirelessly transmits the three pieces of image data DT generated by performing the imaging operation to the information processing apparatus 50 (Step S14).

The information processing apparatus 50 receives the three pieces of image data DT transmitted from the imaging apparatus 10 (Step S15). The reconstruction processing unit 72 of the information processing apparatus 50 generates three reconstructed images RP corresponding to at least one reconstruction position P by performing the reconstruction process on each of the three pieces of image data DT (Step S16). The synthetic aperture processing unit 73 generates the synthetic image SP by performing the synthetic aperture process based on the three reconstructed images RP generated by the reconstruction processing unit 72 (Step S17). The display control unit 74 causes the display 51 to display the synthetic image SP generated by the synthetic aperture processing unit 73 (Step S18).

Next, the information processing apparatus 50 determines whether or not the culturing by the incubator 40 is completed (Step S19). The culturing is carried out for a maximum of 7 days from the start of the culturing, for example. The information processing apparatus 50 determines whether or not the culturing is completed based on, for example, an elapsed time from the start of the culturing. In a case where the information processing apparatus 50 determines that the culturing has not been completed (Step S19: NO), the information processing apparatus 50 determines whether or not a certain time (for example, 10 minutes) has elapsed since the previous imaging (Step S20).

In a case where the information processing apparatus 50 determines that a certain time has elapsed since the previous imaging (Step S20: YES), the processing returns to Step S13. The processes of Steps S13 to S20 are repeatedly executed until the determination is affirmed in Step S19. After the information processing apparatus 50 determines in Step S19 that the culturing by the incubator 40 has been completed (Step S19: YES), the user takes out the imaging apparatus 10 from the culture room 41 of the incubator 40 (Step S21).

As described above, the imaging apparatus 10 according to the technology of the present disclosure captures the interference fringe image by lens-free imaging without using an optical lens, so that the apparatus size is small. Therefore, the imaging apparatus 10 can be taken in and out of the culture room 41 of the small incubator 40 for fertilized eggs. The incubator 40 for fertilized eggs is inexpensive because an optical camera or the like is not integrated.

In addition, in the imaging apparatus in the related art in which the angle change mechanism 19 is not provided, in a case where the height of the imaging apparatus is changed, the position of the intersection K of the central axes 16A of the plurality of illumination light beams 16 is changed, and a shift occurs between the positions of the fertilized egg 21, which is the observation target, and the intersection K. In this way, in a case where the positional shift occurs between the intersection K and the fertilized egg 21, the image quality of the synthetic image SP generated by the synthetic aperture process as described above is deteriorated.

On the other hand, in the imaging apparatus 10 according to the technology of the present disclosure, the light source 18B and the light source 18C are rotated in accordance with the change in the height Zi, so that the position of the intersection K is maintained at the position of the fertilized egg 21. Therefore, the positional shift does not occur, and the high-quality synthetic image SP is obtained. Therefore, according to the technology of the present disclosure, the three-dimensional information of the observation target can be acquired with high accuracy even in a case where the height Zi of the imaging apparatus 10 is changed.

Modification Example of First Embodiment

Next, a modification example of the first embodiment will be described. The angle change mechanism 19 in the above-described embodiment may be an automatic control mechanism that automatically rotates the light source 18B and the light source 18C at an angle determined in accordance with the height Zi of the imaging apparatus 10 by electrical control. In addition, the angles of the light source 18B and the light source 18C may be configured to be manually changeable by the user.

Figure 12:
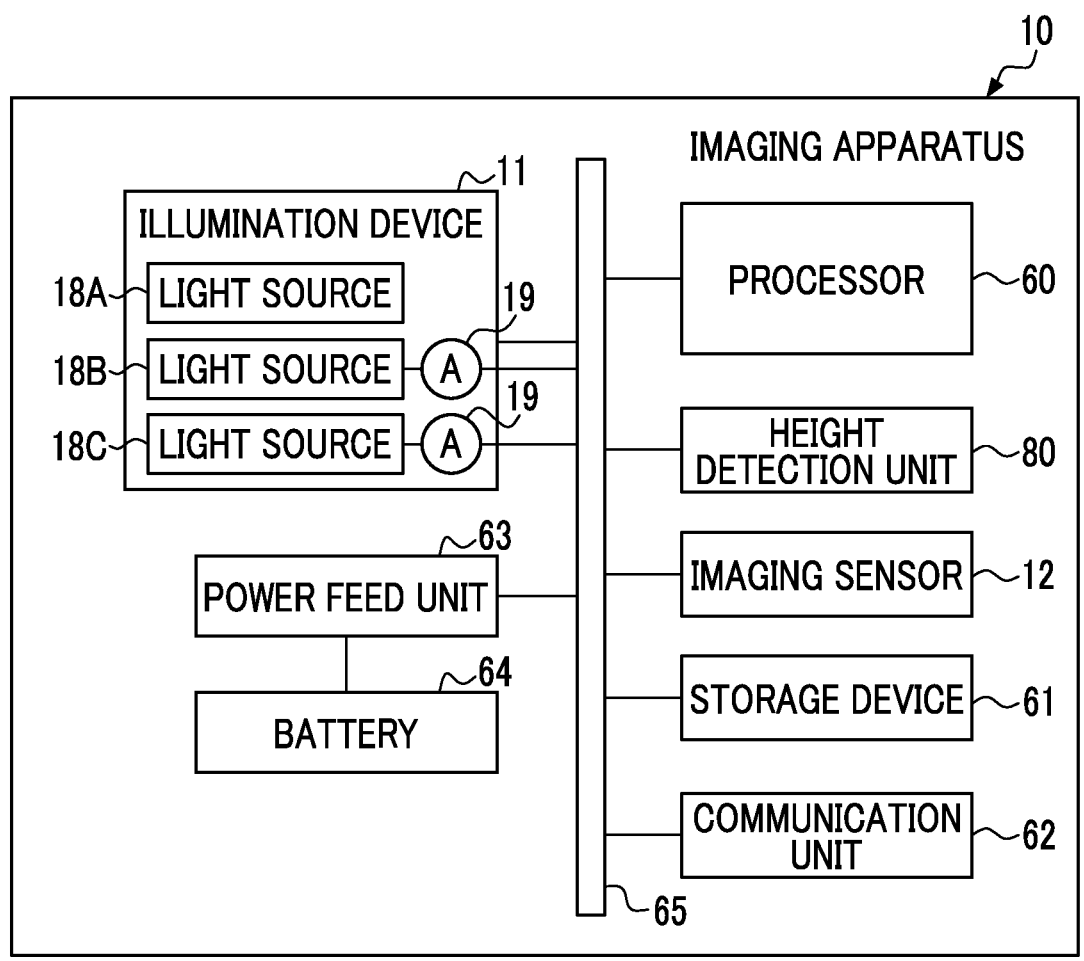
FIG. 12 is a block diagram showing a configuration of an imaging apparatus according to a modification example.

For example, in the first embodiment, the angle change mechanism 19 that rotates the light source 18B and the light source 18C is configured of a mechanical rotation mechanism that is driven in conjunction with the change in the height Zi of the imaging apparatus 10, but may be configured of an actuator that is rotationally driven electrically. In this case, as shown in FIG. 12, the imaging apparatus 10 is provided with a height detection unit 80. The height detection unit 80 is, for example, an encoder provided in the support column 13, and detects the height Zi of the imaging apparatus 10. The processor 60 controls the angle change mechanism 19 configured of the actuator based on a value of the height Zi detected by the height detection unit 80 to rotate the light source 18B and the light source 18C such that the position of the intersection K is maintained at the position of the fertilized egg 21 (that is, the position of the intersection K is not changed).

In addition, the processor 60 may determine a positional relationship between a region (hereinafter, referred to as an estimated region R) where the fertilized egg 21, which is the observation target, is estimated to be present from a geometrical relationship and the interference fringe image 33 in the three pieces of image data DT acquired by the imaging sensor 12, and control the angle change mechanism 19 in accordance with a determination result. Specifically, the processor 60 controls the angle change mechanism 19 to rotate the light source 18B and/or the light source 18C so that the interference fringe image 33 is included in the estimated region R.

Figure 13:
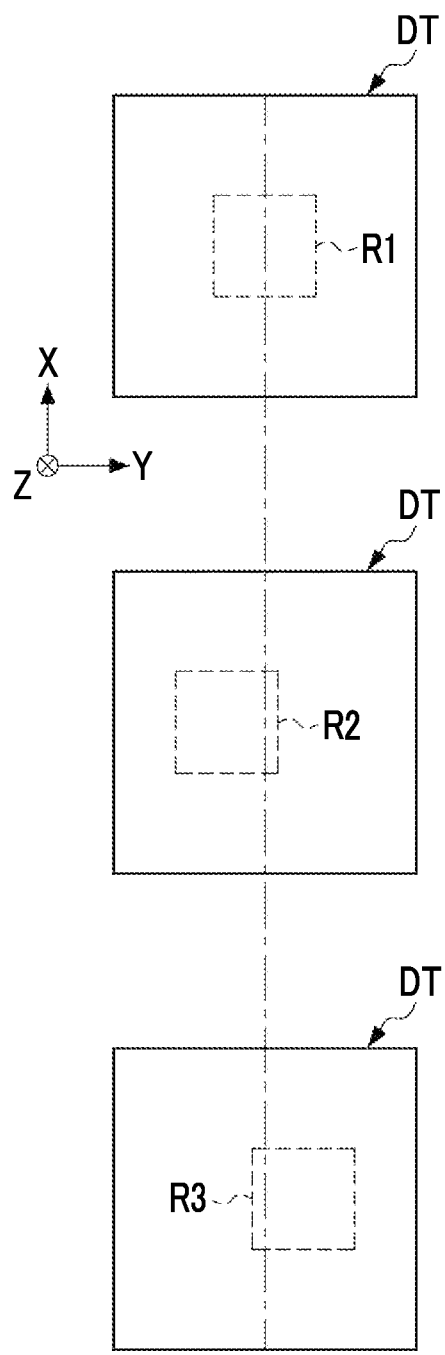
FIG. 13 is a diagram showing an example of an estimated region in the image data.

FIG. 13 shows an example of the estimated region R in a case in which the above-described intersection K is present at the position of the fertilized egg 21. The estimated region R1 is an estimated region R in the image data DT acquired in a case where the illumination light beam 16 is emitted from the light source 18A. The estimated region R2 is an estimated region R in the image data DT acquired in a case where the illumination light beam 16 is emitted from the light source 18B. The estimated region R3 is an estimated region R in the image data DT acquired in a case where the illumination light beam 16 is emitted from the light source 18C.

Figure 14:
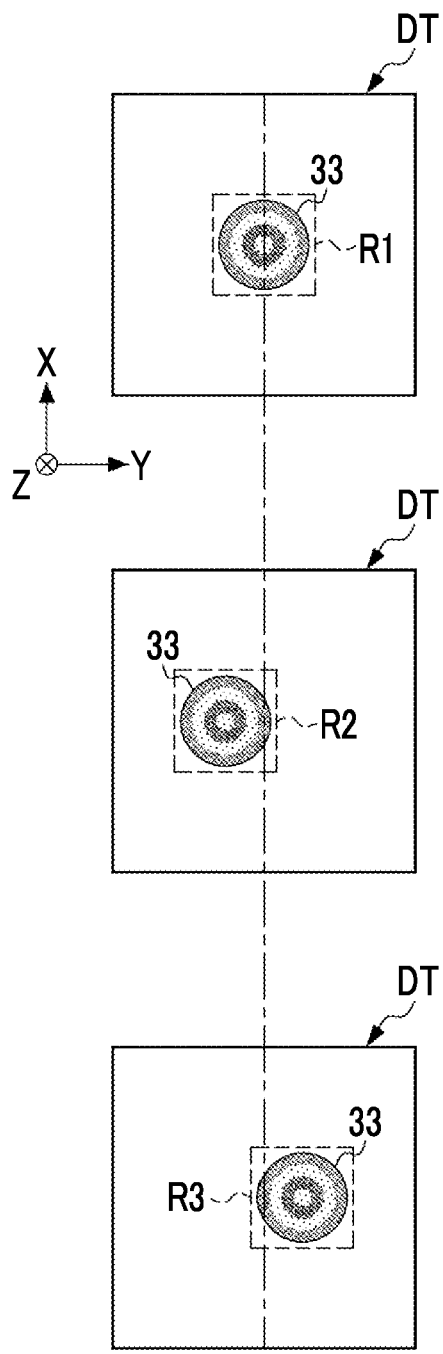
FIG. 14 is a diagram showing an example of a case where the interference fringe image is included in the estimated region.
Figure 15:
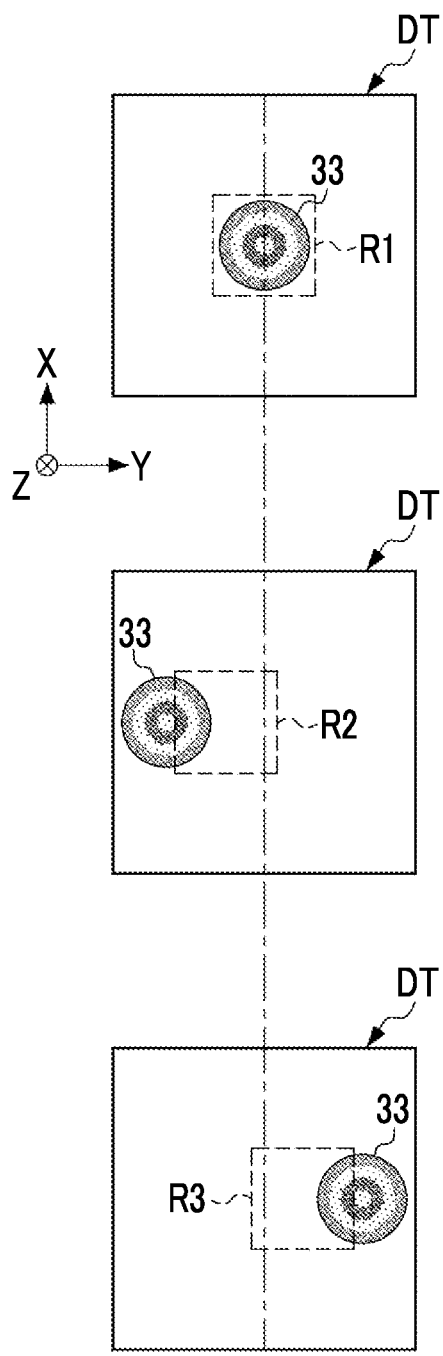
FIG. 15 is a diagram showing an example of a case where the interference fringe image is not included in the estimated region.

As shown in FIG. 14, the inclusion of the interference fringe image 33 in each of the estimated regions R1, R2, and R3 corresponds to the presence of the intersection K at the position of the fertilized egg 21, so that it is not necessary to adjust the rotation angles of the light source 18B and the light source 18C. On the other hand, as shown in FIG. 15, the non-inclusion of the interference fringe image 33 in each of the estimated regions R2 and R3 corresponds to the absence of the intersection K at the position of the fertilized egg 21, so that it is necessary to adjust the rotation angles of the light source 18B and the light source 18C. The non-inclusion of the interference fringe image 33 in the estimated region R also means that the estimated region R does not include a part of the interference fringe image 33.

As shown in FIG. 15, in a case where the interference fringe image 33 is not included in the estimated regions R2 and R3, the processor 60 controls the angle change mechanism 19 to adjust the rotation angles of the light source 18B and the light source 18C such that the interference fringe image 33 is included in the estimated regions R2 and R3.

In addition, in the first embodiment, the angle change mechanism 19 changes the irradiation angle of the illumination light beam 16 with respect to the fertilized egg 21, which is the observation target, by rotating each of the light source 18B and the light source 18C, but the irradiation angle may be changed by changing the angle of the base 17 that supports the light source 18B and the light source 18C. In addition, the angle change mechanism 19 may change the irradiation angle by rotating an optical element, such as a mirror or a lens, provided on an optical path of the illumination light beam 16 emitted from the light source 18B and the light source 18C.

In addition, in the first embodiment, the light sources 18A, 18B, and 18C are arranged along the Y direction, but the arrangement direction is not limited thereto, and the light sources 18A, 18B, and 18C may be arranged along the X direction. In addition, in the first embodiment, although the illumination device 11 has three light sources 18A, 18B, and 18C, the number of light sources included in the illumination device 11 is not limited to three, and need only be two or more. The illumination device according to the technology of the present disclosure need only have a plurality of light sources that irradiate the observation target with illumination light beams at different irradiation angles. The angle change mechanism need only change the irradiation angle of the illumination light beam for at least one of the plurality of light sources.

Each light source included in the illumination device 11 may be a laser light source in which a plurality of light emitting points (for example, 36 light emitting points) are arranged in a two-dimensional array. As this laser light source, a vertical cavity surface emitting laser can be used. A plurality of pieces of image data obtained by performing an imaging operation by the imaging sensor 12 while sequentially emitting a plurality of light emitting points included in one light source are synthesized to obtain one image data DT including a high-resolution interference fringe image (so-called super-resolution interference fringe image).

Figure 16:
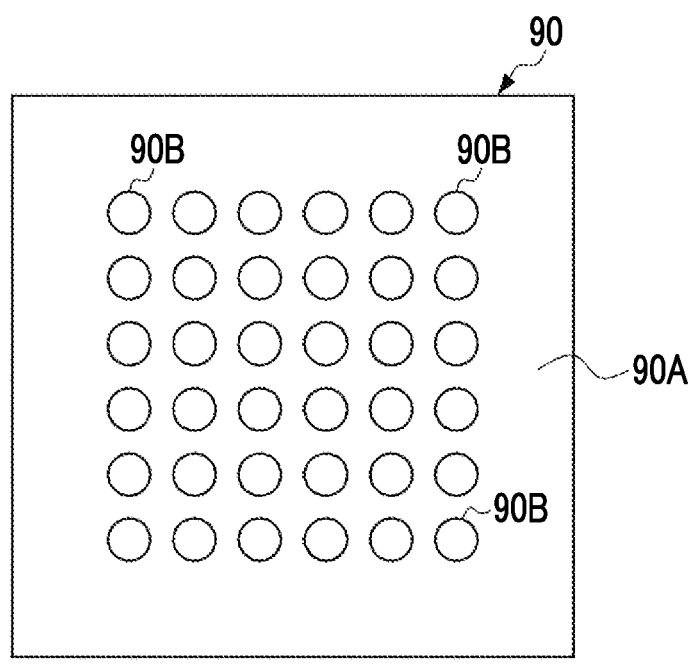
FIG. 16 is a schematic view showing a configuration of a light emitting surface of a light source according to the modification example.

FIG. 16 illustrates a configuration of a light emitting surface 90A of a light source 90 comprising a plurality of light emitting points 90B. The light emitting surface 90A is disposed at a position facing the imaging sensor 12. The plurality of light emitting points 90B are arranged in a two-dimensional array on the light emitting surface 90A. An arrangement pitch of the light emitting points 90B is about 10 μm to 100 μm. The light emitting points 90B are sequentially selected to emit the illumination light beam 16. An emission time interval of the plurality of light emitting points 90B is several milliseconds.

The arrangement pitch of the light emitting points 90B need only be different from the arrangement pitch of the pixels 12B, and does not necessarily have to be smaller than the arrangement pitch of the pixels 12B. For example, even though the light emitting point 90B is located directly above the adjacent pixel 12B, the arrangement pitch of the light emitting points 90B need not match the arrangement pitch of the pixels 12B. In this case, since the illumination light beam 16 is illuminated at different positions on the pixel 12B, in a case of synthesizing the plurality of pieces of image data, it is possible to generate one image data DT including a super-resolution interference fringe image by regarding the different pixels 12B, which are directly below the respective light emitting points 90B and are illuminated with the illumination light beam 16, as the same pixel and performing registration with an accuracy of 1 pixel or less.

In FIG. 16, although the light emitting points 90B are arranged in a 6×6 square arrangement, and 36 light emitting points 90B are provided on the light emitting surface 90A, the number and the arrangement pattern of the light emitting points 90B are not limited to the number and the arrangement pattern shown in FIG. 16. As the number of the light emitting points 90B increases, the resolution of the interference fringe image can be increased, while the operation time of the synthetic process and the reconstruction process becomes longer. Therefore, it is preferable to optimize the number of the light emitting points 90B in accordance with the required image quality and operation time.

In the first embodiment, the synthetic image SP including the three-dimensional information of the fertilized egg 21 is generated by performing the synthetic aperture process based on the plurality of reconstructed images RP generated by the reconstruction processing unit 72. Since the plurality of reconstructed images RP generated by the reconstruction processing unit 72 are images in which the irradiation angles of the illumination light beams 16 with respect to the fertilized egg 21 are different, an image including three-dimensional information may be acquired by performing the operation processing using a filter back projection method or the like used in radiation tomosynthesis imaging or the like.

Second Embodiment

Next, an imaging apparatus according to a second embodiment will be described. In the imaging apparatus according to the second embodiment, a plurality of illumination devices having different irradiation angles of illumination light beams (that is, having different distances from the light sources to the intersection K) are configured to be attachable to and detachable from the support column 13.

FIG. 17 shows a configuration of an imaging apparatus 10A according to the second embodiment. As shown in FIG. 17, in the present embodiment, a first illumination device 11A and a second illumination device 11B are configured to be selectively attached to the support column 13. For example, an attachment portion 13D to which the first illumination device 11A and the second illumination device 11B are selectively attached is provided at an end portion of the upper part 13A.

The first illumination device 11A and the second illumination device 11B are configured of the base 17 and the three light sources 18A, 18B, and 18C, as with the illumination device 11 of the first embodiment. However, the light source 18B and the light source 18C are fixed to the base 17 and are not rotatable. In the present embodiment, the angle change mechanism is configured of the first illumination device 11A and the second illumination device 11B, and the attachment portion 13D.

The first illumination device 11A and the second illumination device 11B have different attachment angles of the light source 18B and the light source 18C with respect to the base 17. That is, the first illumination device 11A and the second illumination device 11B have different irradiation angles (that is, angles of the central axes 16A) of the illumination light beams 16 by the light source 18B and the light source 18C. The first illumination device 11A has a shorter distance from the light sources 18A, 18B, and 18C to the intersection K than the second illumination device 11B. The first illumination device 11A is suitable for a case where the height Zi of the imaging apparatus 10A is low. The second illumination device 11B is suitable for a case where the height Zi of the imaging apparatus 10A is high.

In the present embodiment, the height Zi of the imaging apparatus 10A can be changed in two stages of "L" and "H". In a case where Zi=L, the first illumination device 11A is attached to the support column 13, so that the position of the intersection K and the position of the fertilized egg 21 match each other. In a case where Zi=H, the second illumination device 11B is attached to the support column 13, so that the position of the intersection K and the position of the fertilized egg 21 match each other.

In the present embodiment, in a case where the user changes the height Zi of the imaging apparatus 10A, the user can make the intersection K match the position of the fertilized egg 21, which is the observation target, by attaching any one of the first illumination device 11A or the second illumination device 11B to the support column 13 in accordance with the height Zi. As a result, three-dimensional information of the observation target can be acquired with high accuracy.

In the second embodiment, although two illumination devices having different irradiation angles of the illumination light beams 16 can be selectively attached to the support column 13, three or more illumination devices having different irradiation angles of the illumination light beams 16 may be selectively attached to the support column 13. In this case, the height Zi of the imaging apparatus 10A can be changed to three or more stages in accordance with the irradiation angle of each illumination device. The changeable height Zi of the imaging apparatus 10A may be determined in advance, and an illumination device that emits the illumination light beam 16 at an irradiation angle suitable for each height Zi need only be provided.

In addition, in the second embodiment, the irradiation angle is changed by changing the illumination device attached to the support column 13, but the irradiation angle may be changed by changing a part of the light source in the illumination device, the base of the light source, the mirror or the lens disposed on the optical path of the illumination light beam, or the like.

Various modification examples of the first embodiment described above can also be applied to the second embodiment. In the first embodiment and the second embodiment, although the observation object is a fertilized egg, the observation object is not limited to the fertilized egg. The observation object may be a floating cell other than the fertilized egg. The floating cell is a cell that floats in a culture solution. In addition to the fertilized eggs, the floating cells include Chinese hamster ovary (CHO) cells used for antibody production.

A hardware configuration of a computer constituting the information processing apparatus 50 can be modified in various ways. For example, the information processing apparatus 50 can be configured by a plurality of computers separated as hardware for the purpose of improving processing capacity and reliability.

As described above, the hardware configuration of the computer of the information processing apparatus 50 can be appropriately changed according to the required performance such as processing capacity, safety, and reliability. Further, not only the hardware but also the application program such as the operation program 56A can be duplicated or stored in a plurality of storage devices in a distributed manner for the purpose of securing safety and reliability.

The hardware structures of processing units that execute various kinds of processing, such as the image data acquisition unit 71, the reconstruction processing unit 72, the synthetic aperture processing unit 73, and the display control unit 74 can use various processors described below. As described above, the various processors include, in addition to the CPU that is a general-purpose processor that executes software (operation program 56A) to function as various processing units, a programmable logic device (PLD) that is a processor capable of changing a circuit configuration after manufacture, such as an FPGA, and an exclusive electric circuit that is a processor having a circuit configuration exclusively designed to execute specific processing, such as an application specific integrated circuit (ASIC).

One processing unit may be constituted by one of these various processors, or may be a combination of two or more processors of the same type or different types (for example, a combination of a plurality of FPGAs and/or a combination of a CPU and an FPGA). A plurality of processing units may be constituted by one processor.

As an example in which the plurality of processing units are constituted by one processor, first, as represented by a computer such as a client and a server, one processor is constituted by a combination of one or more CPUs and software and this processor functions as the plurality of processing units. Second, as represented by a system on chip (SoC), a processor that realizes the functions of the entire system including the plurality of processing units by using one integrated circuit (IC) chip is used. As described above, the various processing units are constituted by using one or more of the various processors described above as a hardware structure.

Further, as the hardware structure of these various processors, more specifically, an electric circuit (circuitry) in which circuit elements such as semiconductor elements are combined can be used.

The above-described embodiments and modification examples can be appropriately combined to the extent that no contradiction occurs.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging apparatus comprising:
    an illumination device that has a plurality of light sources which irradiate an observation target with illumination light beams at different irradiation angles;
    an imaging sensor that captures an interference fringe image generated by the observation target irradiated with the illumination light beams to generate image data;
    a height adjustment mechanism that enables a height of the illumination device with respect to the imaging sensor to be adjusted; and
    an angle change mechanism that changes the irradiation angle of the illumination light beam in accordance with the height such that an intersection of central axes of the illumination light beams emitted from the plurality of light sources is located on the observation target.

2. The imaging apparatus according to claim 1, wherein the angle change mechanism changes the irradiation angle of the illumination light beam by rotating at least one of the plurality of light sources.

3. The imaging apparatus according to claim 1, wherein the angle change mechanism changes the irradiation angle of the illumination light beam in conjunction with the change of the height by the height adjustment mechanism.

4. The imaging apparatus according to claim 1, further comprising:
    a first processor that controls the angle change mechanism to change the irradiation angle, wherein the first processor adjusts the irradiation angle by controlling the angle change mechanism based on a positional relationship between an estimated region where the observation target is estimated to be present and the interference fringe image in the image data.

5. The imaging apparatus according to claim 1, further comprising:
a support column that supports the illumination device,
wherein the height adjustment mechanism enables a length of the support column to be changed.

6. The imaging apparatus according to claim 1,
wherein the angle change mechanism is configured of a plurality of the illumination devices having different irradiation angles of the illumination light beams and an attachment portion to which the plurality of illumination devices are selectively attached.

7. The imaging apparatus according to claim 6, further comprising:
a support column that supports the illumination device,
wherein the height adjustment mechanism enables a length of the support column to be changed, and
the attachment portion is provided on the support column.

8. The imaging apparatus according to claim 1, further comprising:
a communication device that wirelessly transmits the image data.

9. An information processing apparatus comprising:
a second processor that generates a reconstructed image by receiving the image data transmitted from the imaging apparatus according to claim 8 and performing a reconstruction process based on the received image data.

10. The information processing apparatus according to claim 9,
wherein the second processor generates a synthetic image by performing a synthetic aperture process on a plurality of the reconstructed images corresponding to the plurality of light sources.

* * * * *